US009610916B2

(12) United States Patent
Kawamura et al.

(10) Patent No.: US 9,610,916 B2
(45) Date of Patent: Apr. 4, 2017

(54) HEAD-PROTECTING AIRBAG DEVICE

(71) Applicant: TOYODA GOSEI CO., LTD., Kiyosu-shi, Aichi-ken (JP)

(72) Inventors: Koji Kawamura, Kiyosu (JP); Yuji Sato, Kiyosu (JP); Masaaki Okuhara, Kiyosu (JP); Masashi Hotta, Kiyosu (JP); Takuya Hiraiwa, Kiyosu (JP); Takashi Iida, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 14/972,296

(22) Filed: Dec. 17, 2015

(65) Prior Publication Data

US 2016/0185314 A1 Jun. 30, 2016

(30) Foreign Application Priority Data

Dec. 26, 2014 (JP) ................................. 2014-265463

(51) Int. Cl.
*B60R 21/232* (2011.01)
*B60R 21/233* (2006.01)
*B60R 21/2338* (2011.01)

(52) U.S. Cl.
CPC ........ *B60R 21/232* (2013.01); *B60R 21/2338* (2013.01); *B60R 2021/23386* (2013.01)

(58) Field of Classification Search
CPC .............. B60R 21/232; B60R 21/2338; B60R 2021/23386
IPC .................................................. B60R 21/232
See application file for complete search history.

(56) References Cited

U.S. PATENT DOCUMENTS

| 7,278,659 | B2 * | 10/2007 | Takahara | B60R 21/232 280/728.1 |
| 7,658,401 | B2 * | 2/2010 | Valdez | B60R 21/232 280/730.2 |
| 8,636,301 | B1 * | 1/2014 | Wang | B60R 21/232 280/730.2 |
| 2007/0052212 | A1 * | 3/2007 | Powals | B60R 21/232 280/729 |
| 2010/0225097 | A1 | 9/2010 | Trovato et al. | |
| 2014/0217707 | A1 * | 8/2014 | Konishi | B60R 21/213 280/728.2 |
| 2014/0217710 | A1 * | 8/2014 | Fukawatase | B60R 21/233 280/730.2 |

(Continued)

FOREIGN PATENT DOCUMENTS

| JP | 2008-006895 A | 1/2008 |
| JP | 2012-020719 A | 2/2012 |

*Primary Examiner* — Ruth Ilan
(74) *Attorney, Agent, or Firm* — Posz Law Group, PLC

(57) ABSTRACT

An airbag of a head-protecting airbag device includes a bag body and a connecting member. The bag body includes a general inflatable portion and a terminal inflatable portion adjoining the general inflatable portion and located at a terminal region in a front and rear direction of the bag body. The connecting member is disposed over an outboard side of the terminal inflatable portion and includes at the leading end a mounting portion to be secured to a periphery of a vehicle window. The root end of the connecting member is jointed to a closed portion of the bag body at least by two jointing points disposed away from each other in an up and down direction. The jointing points are generally equally distant from the mounting portion.

12 Claims, 11 Drawing Sheets

(56) References Cited

U.S. PATENT DOCUMENTS

| | | |
|---|---|---|
| 2014/0239619 A1 | 8/2014 | Fukawatase et al. |
| 2015/0151708 A1* | 6/2015 | Kawamura ........... B60R 21/232 280/728.2 |
| 2016/0221527 A1* | 8/2016 | Sugimori .............. B60R 21/232 |

* cited by examiner

HEAD-PROTECTING AIRBAG DEVICE

CROSS REFERENCE TO RELATED APPLICATIONS

The Present application claims priority from Japanese Patent Application No. 2014-265463 of Kawamura et al., filed on Dec. 26, 2014, the entire disclosure of which is incorporated herein by reference.

BACKGROUND OF THE INVENTION

1. Field of the Invention

The present invention relates to a head-protecting airbag device whose airbag is mountable on an upper periphery of a window of a vehicle at an inboard side of the vehicle in a folded-up configuration with an upper edge thereof secured to a vehicle body structure and is deployable downward over the window when fed with an inflation gas.

2. Description of Related Art

In an known head-protecting airbag device as disclosed in JP2008-6895A (Literature 1), JP2010-202187A (Literature 2), JP2013-52748A (Literature 3), JP2014-162313A (Literature 4) and JP2012-20719A (Literature 5), an airbag includes an airbag body for covering an inboard side of a window of a vehicle, a terminal inflatable portion which is disposed at the front end region of the airbag body as deployed in such a manner as to be partitioned from a remaining general inflatable portion of the airbag body, and a connecting member which connect the front end region of the airbag body to the vehicle body structure. The connecting member is arranged over the outboard side of the terminal inflatable portion. A first end (or root end) of the connecting member is jointed to a terminal partitioning portion which partitions the terminal inflatable portion from the general inflatable portion while a second end (or leading end) of the connecting member is adapted to be fixed to the vehicle body structure at a periphery of the window. At airbag deployment, a tension force occurs in the connecting member generally along a front and rear direction of the airbag and the connecting member supports the outboard side of the terminal inflatable portion such that the terminal inflatable portion protects an occupant's head in the event of an oblique collision.

While the connecting member of the head-protecting airbag device disclosed in the Literature 5 is formed into a band, each of the connecting members in the Literatures 1 to 4 has such a sheet shape as to cover a considerable area in an up and down direction of the outboard side of the terminal inflatable portion. However, in the head-protecting airbag devices disclosed in the Literatures 1 to 4, a straight joint extending generally along an up and down direction joints the connecting member to the airbag body. With this configuration, although the joint joints the connecting member to the airbag body over an extended area in an up and down direction, the tension force exerted in the connecting member occurs only on a line connecting the leading end (second end) of the connecting member to be fixed to the vehicle body structure and a point on the joint which makes the shortest distance to the leading end in direct distance. Accordingly, an improvement is desired in order to exert a tension force in a wider area in an up and down direction in the connecting member in a steady fashion.

SUMMARY OF THE INVENTION

The present invention has an object to provide a head-protecting airbag device that is capable of exerting a tension force in a wide area in an up and down direction in the connecting member in a steady fashion at airbag deployment such that the connecting member supports an outboard side of the terminal inflatable portion in a steady fashion.

The head-protecting airbag device of the invention includes an airbag that is mountable on an upper periphery of a window of a vehicle on an inboard side of the vehicle in a folded-up configuration and is deployable downward over the window. The airbag includes a bag body and a connecting member.

The bag body is adapted to be mounted on a vehicle body structure at the upper periphery of the window by a plurality of positions on an upper edge of the bag body, and includes an inflatable portion that is inflatable with an inflation gas fed by an inflator in such a manner as to separate an inboard side wall and an outboard side wall of the bag body, and a closed portion at which the inboard side wall and the outboard side wall are jointed together. The inflatable portion includes a general inflatable portion and a terminal inflatable portion that adjoins the general inflatable portion and is located at a terminal region in a front and rear direction of the bag body as deployed.

The connecting member is formed of a flexible sheet material and disposed over an outboard side of the terminal inflatable portion for exerting a tension force generally along a front and rear direction thereof at deployment of the bag body. The connecting member includes a first end that is jointed to the closed portion of the bag body and a second end provided with a mounting portion which is adapted to be secured to the vehicle body structure in the periphery of the window distant from the terminal region of the bag body.

The first end of the connecting member is jointed to the closed portion of the bag body by at least two jointing points that are disposed away from each other in an up and down direction. Distances between each of the jointing points and the mounting portion formed at the second end of the connecting member are generally equal. The connecting member is not jointed to the bag body at any position closer to the mounting portion than the jointing points.

In the head-protecting airbag device of the invention, the first end of the connecting member disposed over the outboard side of the terminal inflatable portion is jointed to the closed portion of the bag body by the at least two jointing points distant from each other in an up and down direction. The distances between each of the jointing points and the mounting portion, which is formed at the second end of the connecting member to be secured to the vehicle body structure, are generally equal, and the connecting member is not jointed to the bag body at any position closer to the mounting portion than the jointing points. That is, since the at least two jointing points are disposed away from each other in an up and down direction and are generally equally distant from the mounting portion, a tension force occurs at least on two lines connecting the upper jointing point/lower jointing point and the mounting portion at airbag deployment. Accordingly, the head-protecting airbag device of the invention will be able to exert the tension force in a greater area in an up and down direction of the connecting member at airbag deployment in comparison with conventional head-protecting airbag devices, and enable this connecting member to support the outboard side of the terminal inflatable portion in a steady fashion. As a consequence, the terminal inflatable portion as fully inflated will be able to protect the head of a vehicle occupant when it moves obliquely forward or rearward and toward an outboard direction.

Therefore, the head-protecting airbag device of the invention is capable of exerting a tension force in a wide area in an up and down direction in the connecting member in a steady fashion at airbag deployment such that the connecting member supports the outboard side of the terminal inflatable portion in a steady fashion.

In the airbag device of the invention, it is desired that the closed portion is formed into an elongate shape extending generally along an up and down direction in such a manner as to partition the terminal inflatable portion from the general inflatable portion. This configuration will help inflate the terminal inflatable portion into a rod shape extending generally along an up and down direction and deploy the terminal inflatable portion towards the interior of the vehicle in such a manner that the terminal inflatable portion is bent towards the interior of vehicle at the closed portion relative to the general inflatable portion while being supported by the connecting member. Such a terminal inflatable portion will be further suitable for protecting the occupant's head when it moves obliquely forward or rearward and toward an outboard direction.

In the airbag device of the invention, moreover, the connecting member desirably includes a cover portion for covering a generally triangular area of the outboard side of the terminal inflatable portion defined by the mounting portion and the two jointing points. At airbag deployment, such a cover portion will support a wide area of the outboard side of the terminal inflatable portion and secure a generally uniform reaction force in the wide area when the terminal inflatable portion cushions the occupant's head, and as a result, the terminal inflatable portion will cushion the occupant's head in an adequate fashion.

It is also desired in the airbag device of the invention that the closed portion is formed into a rod that is curved in a generally arcuate fashion such that a central region in an up and down direction of the closed portion protrudes towards the general inflatable portion and that a part of the terminal inflatable portion is disposed between the upper jointing point and lower jointing point. This configuration widens an inflatable area of the terminal inflatable portion such that the terminal inflatable portion will be inflated in a thick fashion.

The bag body may include a plurality of jointing points to joint the first end of the connecting member to the closed portion including the upper and lower jointing points. In that instance, it is desired that at least one of those jointing points is formed into such a curve as to draw an arc of a circle centered at the mounting portion in a corresponding fashion to the closed portion. This configuration will help exert such a tension force in the connecting member as to pull the jointing point formed into a curve in a generally uniform fashion at airbag deployment. Further, since the closed portion to which the curving jointing point is jointed has a curved shape in a similar fashion to the curving jointing point, the connecting member will smoothly cover and support the outer surface of the terminal inflatable portion in a vicinity of the closed portion in an area of the curving jointing point. Thus the connecting member will be able to secure a uniform reaction force in the area of the curving jointing point and support the terminal inflatable portion with the uniform reaction force when the terminal inflatable portion cushions the occupant's head, such that the terminal inflatable portion will cushion the occupant's head in an adequate fashion.

Alternatively, the jointing points may be elongated to be continuous with each other and form such elongate curve as to draw an arc of a circle centered at the mounting portion, in a corresponding fashion to the closed portion. This configuration will help exert a great tension force in the connecting member pulling a generally entire first end region in a generally uniform fashion at airbag deployment. Further, since the closed portion to which the elongate jointing point is jointed has a curved shape in a similar fashion to the jointing point, a generally entire area in an up and down direction of the connecting member will smoothly cover and support the outer surface of the terminal inflatable portion in a vicinity of the closed portion. Thus the connecting member will be able to secure a uniform reaction force in a generally entire area in an up and down direction and support a wide area in an up and down direction of the terminal inflatable portion when the terminal inflatable portion cushions the occupant's head, such that the terminal inflatable portion will cushion the occupant's head in an adequate fashion.

It is further desired in the head-protecting airbag device of the invention that the jointing point disposed on the lower side is disposed at a position on the lower side of the mounting portion at airbag deployment. With this configuration, at airbag deployment, the connecting member will pull a region of the terminal inflatable portion below the mounting portion forward or rearward and towards an outboard direction, such that the terminal inflatable portion, which is secured to the vehicle body structure by the upper edge, is deployed in such a manner as to be twisted. Accordingly, during deployment, the lower end region of the terminal inflatable portion will be prevented from being considerably engaged with an airbag for a steering wheel or a front passenger seat which is being deployed in proximity, even if the bag body is so designed that the lower edge is deployable below a beltline of the vehicle for protecting an occupant's head at an oblique collision or a rollover and the terminal inflatable portion is disposed, by way of example, at a front end region of the bag body so as to be deployable on an inboard side of a front pillar extending obliquely vertically in the front edge of the window.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
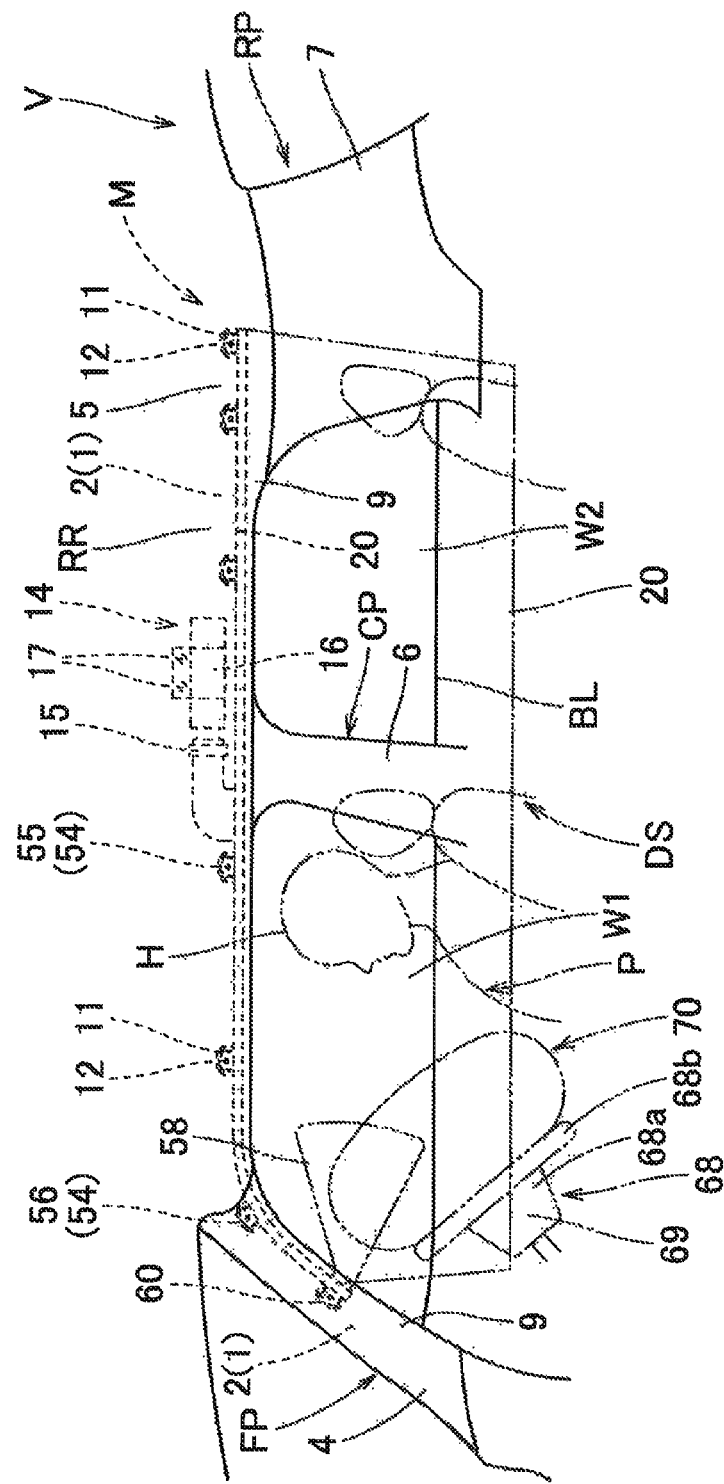
FIG. 1 is a schematic front view of a head-protecting airbag device embodying the invention as viewed from a vehicle interior.

As shown in FIG. 1, a head-protecting airbag device M embodying the present invention is mounted on a vehicle V with two side windows W1 and W2, i.e., with two rows of seats. The following embodiment describes the airbag device M which is mounted on upper peripheries of the windows W1 and W2 disposed on the right side of the driver's seat DS of a right-hand drive vehicle. The head-protecting airbag device M includes an airbag 20, an inflator 14, mounting brackets 11, a mounting bracket 16, and an airbag cover 9, as shown in FIG. 1. The airbag 20 is housed at the upper peripheries of the windows W1 and W2 on an inboard side of the vehicle V in a folded-up configuration, specifically from a lower periphery of a front pillar FP to a region above a rear pillar RP, via a lower periphery of a roof side rail RR.

Figure 8:
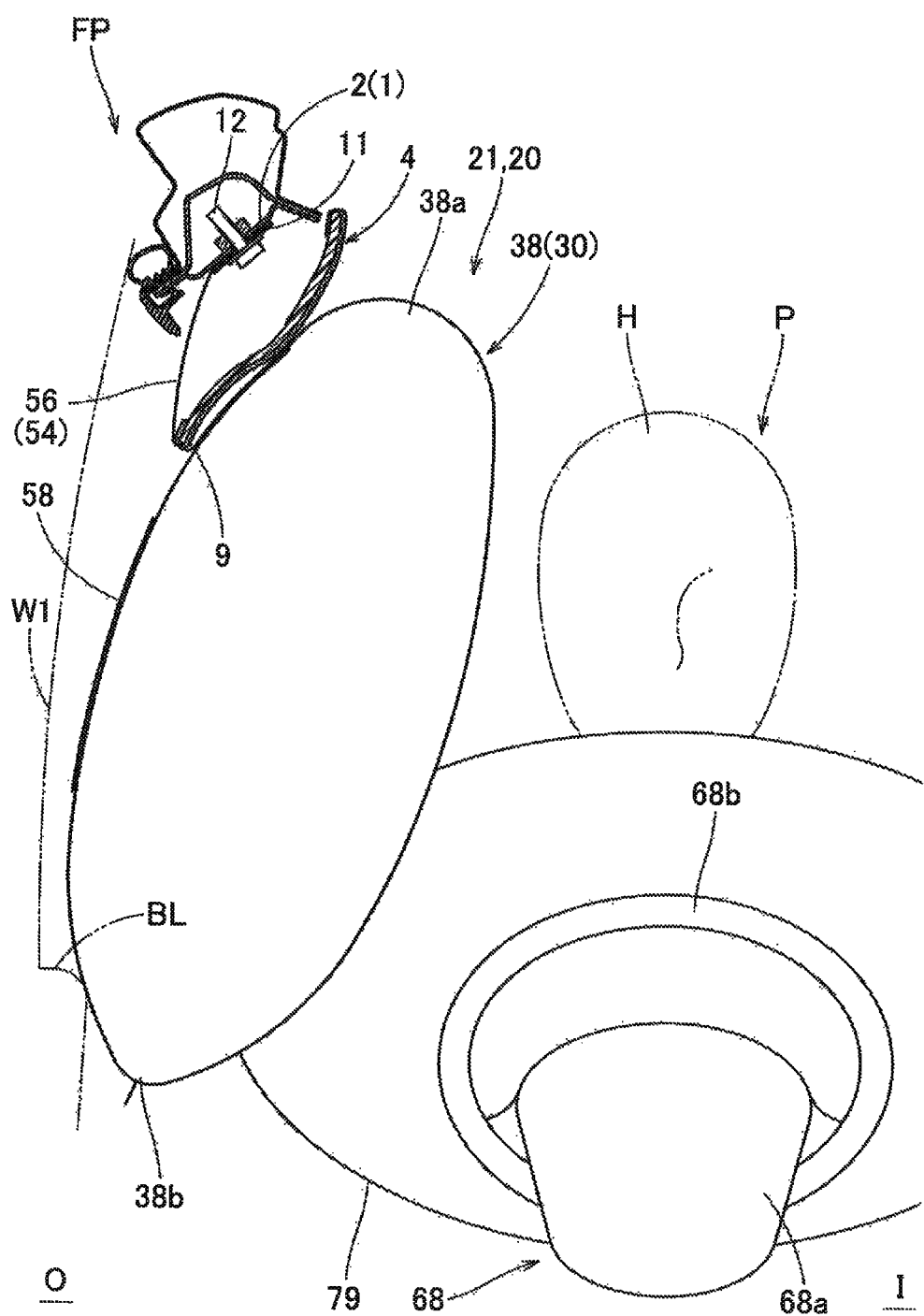
FIG. 8 is a schematic partial enlarged vertical section of the airbag device at airbag deployment.
Figure 9:
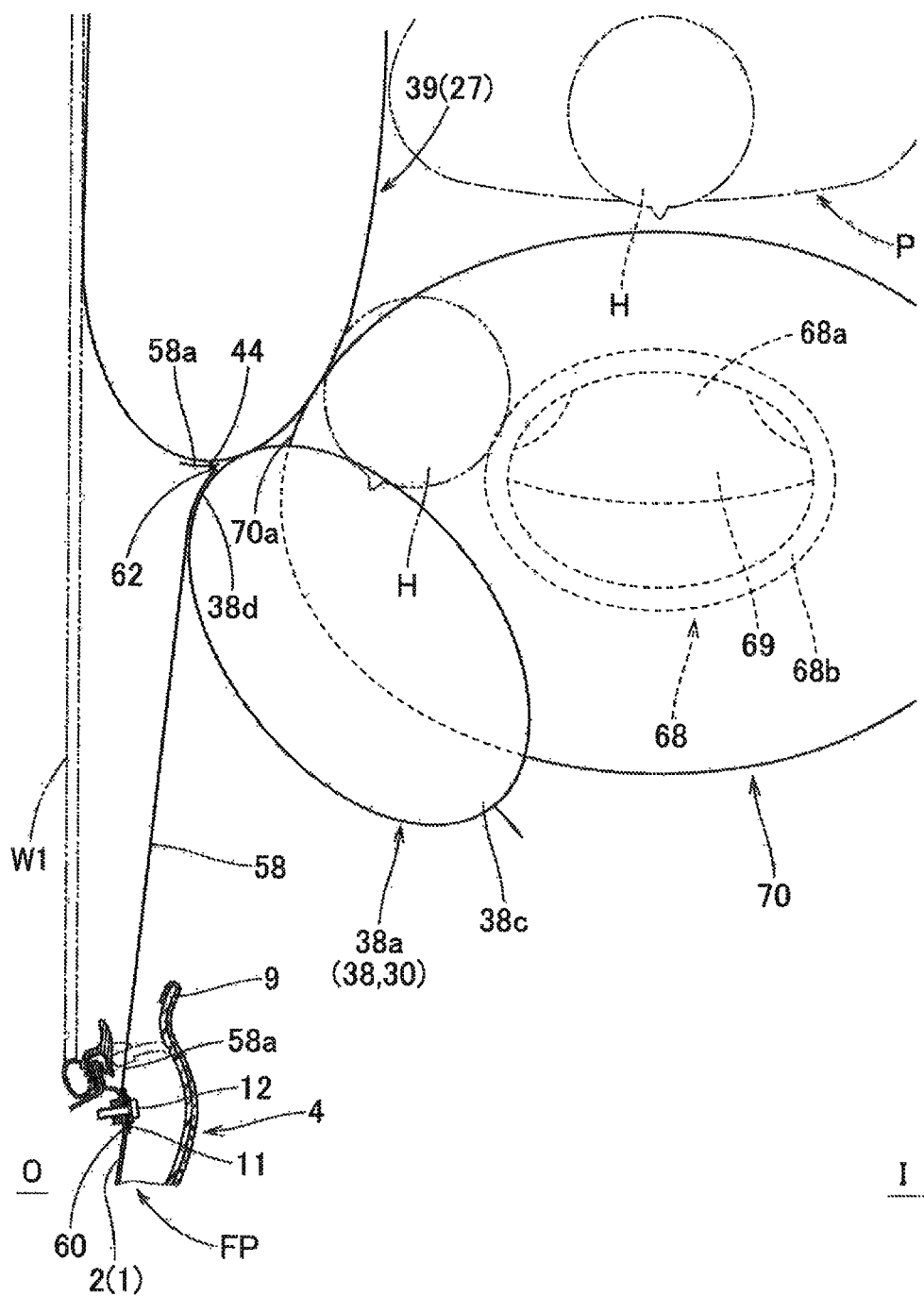
FIG. 9 is a schematic partial enlarged horizontal section taken along a front and rear direction of the airbag device at airbag deployment.

As shown in FIGS. 1, 8 and 9, the airbag cover 9 is composed of a lower hem of a front pillar garnish 4 arranged on the front pillar FP and a lower hem of a roof head liner 5 arranged on the roof side rail RR. The front pillar garnish 4 and roof head liner 5 are fabricated of synthetic resin and secured to an inner panel 2 of the vehicle body structure 1 at the front pillar FP and roof side rail RR on the inboard side of the vehicle V. The airbag cover 9 covers an inboard side of the airbag 20 and is openable toward an interior I of the vehicle when pushed by the airbag 20 under inflation for allowing airbag emergence and downward deployment (FIGS. 8 and 9).

As shown in FIG. 1, the inflator 14 is substantially cylindrical in shape and includes at the leading end gas discharge ports (not shown) for feeding an inflation gas into the airbag 20. The leading end of the inflator 14 provided with the gas discharge ports is inserted into a later-described connection port 26 of the airbag 20, and a clamp 15 is mounted around the connection port 26, thus the inflator 14 is coupled to the airbag 20. The inflator 14 is secured to the inner panel 2 above the window W2 by a mounting bracket 16 mounted around the inflator 14 and mounting bolts 17 for fixing the mounting bracket 16 to the inner panel 2 (FIG. 1). The inflator 14 is electrically connected with a not-shown control of the vehicle V with a not-shown lead wire, and is so designed as to be actuated in response to an actuating signal fed from the control that has detected a side impact, an oblique collision or a rollover of the vehicle V.

Mounting brackets 11 are used to mount the airbag 20 on the inner panel 2. Each of the mounting brackets 11 is composed of a pair of plates of metal, which are applied to inboard and outboard sides of each of later-described mounting portions 54 and 60 of the airbag 20. Mounting bolts 12 are used to secure the mounting brackets 11, together with the mounting portions 54 and 60, to the inner panel 2 as shown in FIGS. 8 and 9.

As shown in FIGS. 2 to 5, the airbag 20 includes a bag body 21 and a connecting member 58 that extends from either front or rear end region of the bag body 21 to be fixed to the inner panel 2 by the leading end (or second end) 58b. In the illustrated embodiment, the connecting member 58 extends from the front end region of the bag body 21.

Figure 2:
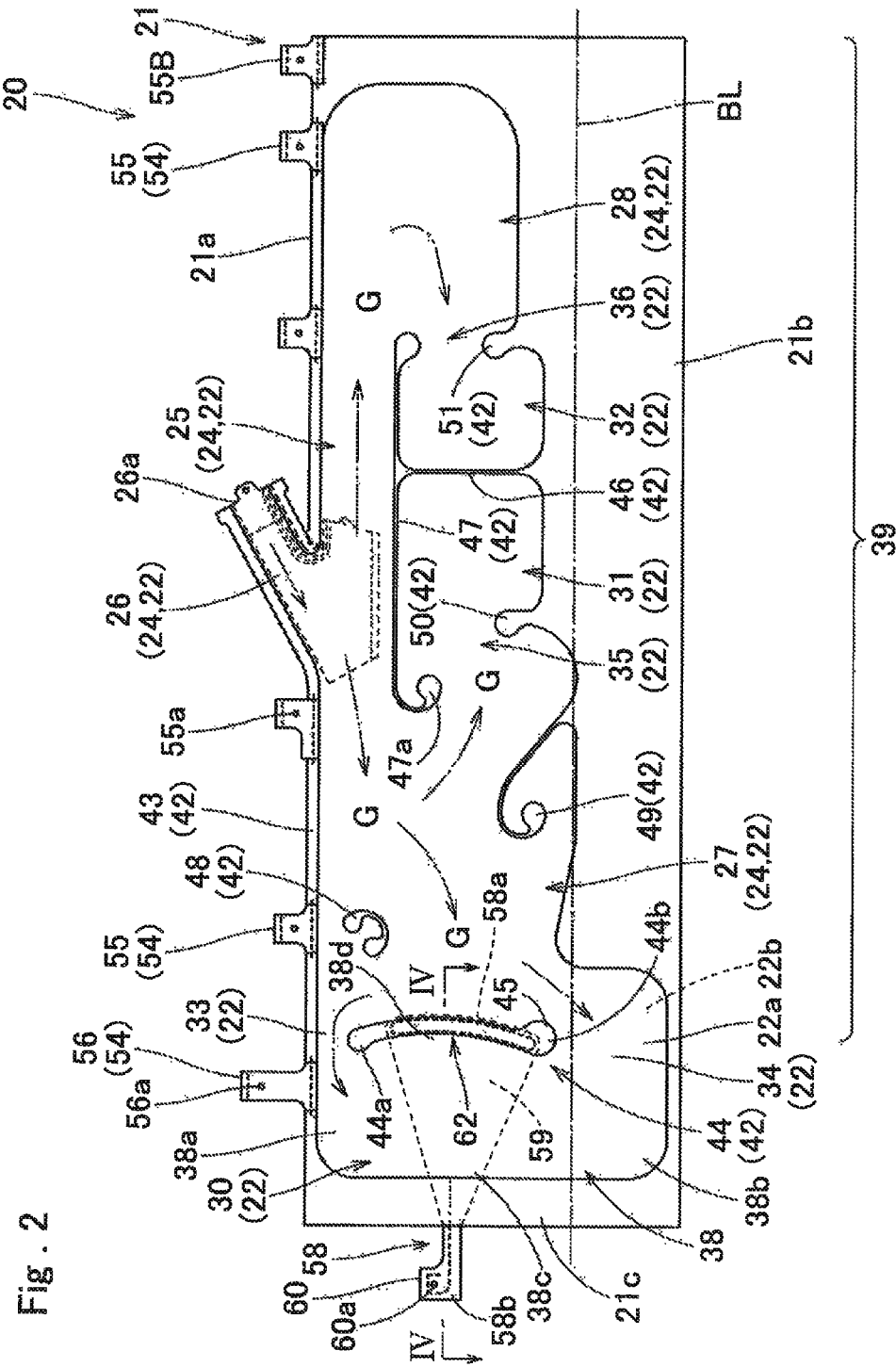
FIG. 2 is a front view of an airbag for use in the airbag device of FIG. 1 in a flattened state.
Figure 6:
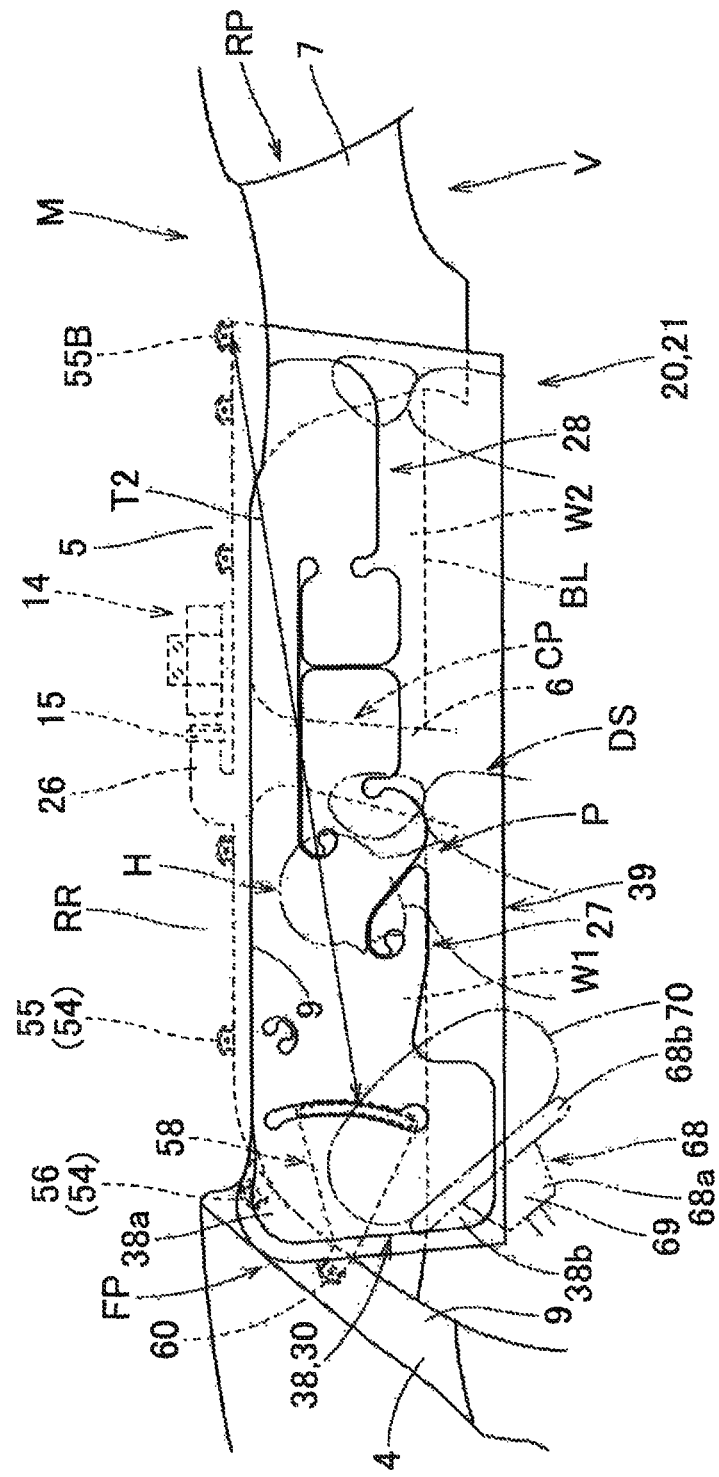
FIG. 6 is a schematic front view of the head-protecting airbag device at airbag deployment as viewed from the vehicle interior.

As shown in FIGS. 1 (by double-dotted lines) and 6, the bag body 21 is designed to inflate and unfold from a folded-up configuration when fed with an inflation gas from the inflator 14 so as to cover inboard sides of the windows W1, W2 and pillar garnishes 6 and 7 of the center pillar CP and rear pillar RP. The bag body 21 is formed into such a generally rectangular plate extending generally along a front and rear direction as to cover a region ranging from the window W1 to a front area of the rear pillar RP via the center pillar CP and window W2 (FIG. 2). As shown in FIG. 6, the bag body 21 has such a width in an up and down direction that the lower edge 21b of the bag body 21 is deployable below a beltline BL of the vehicle constituted by lower edges of the windows W1 and W2.

Figure 3:
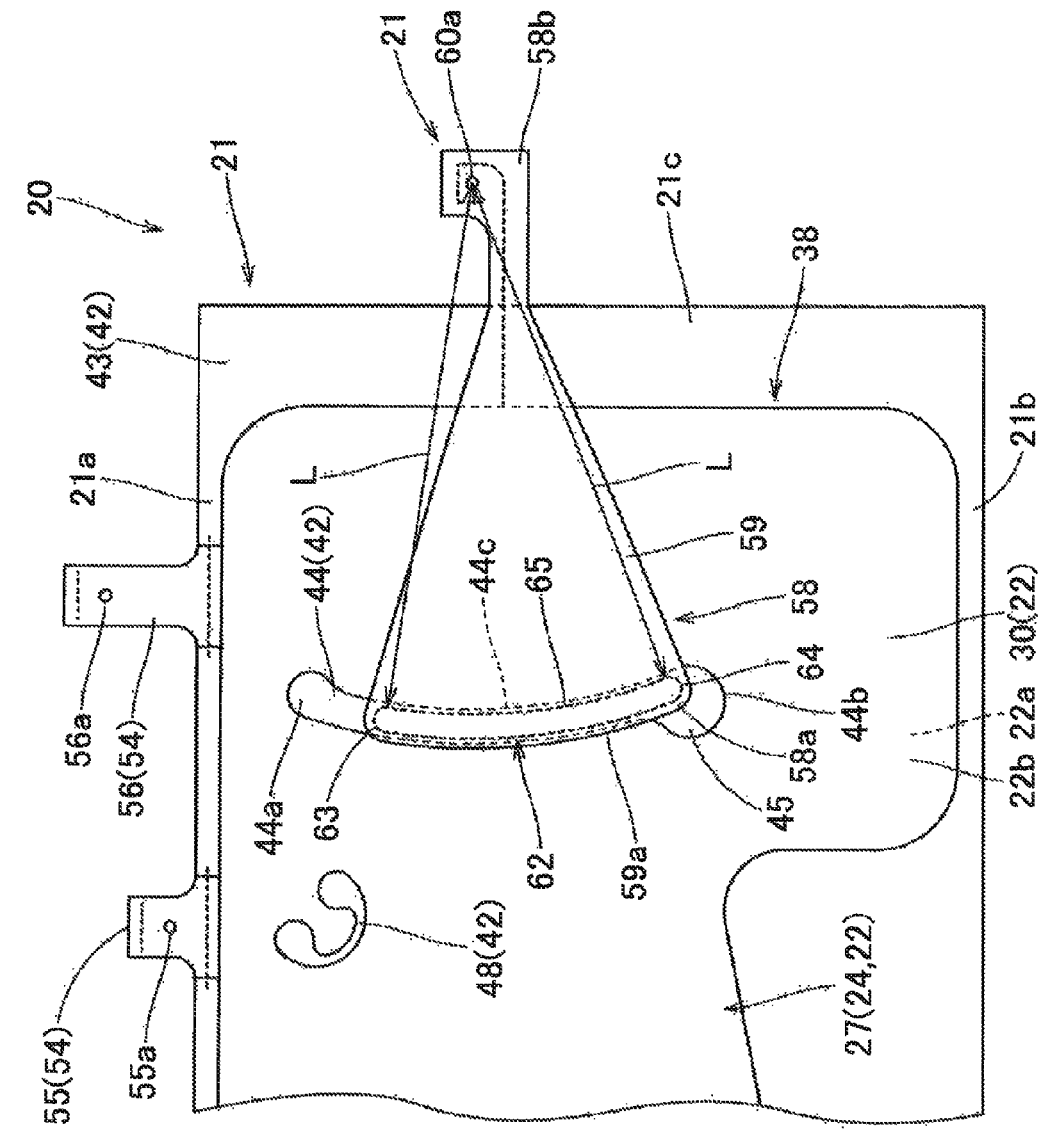
FIG. 3 is a partial enlarged rear view of the airbag of FIG. 2 particularly depicting a terminal inflatable portion and a connecting member.
Figure 4:
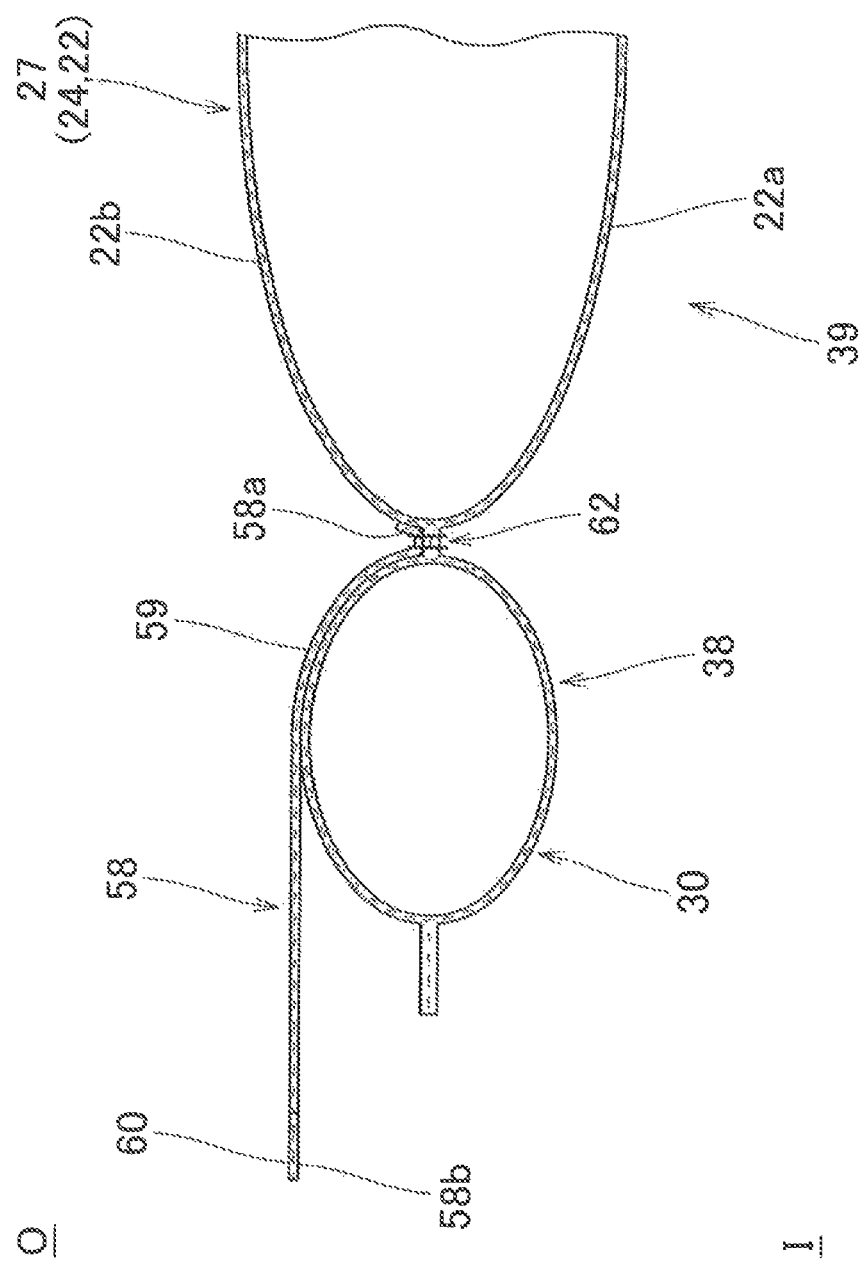
FIG. 4 is a partial enlarged sectional view taken along line IV-IV of FIG. 2.

The bag body 21 of the illustrated embodiment is made by hollow-weaving method using polyamide yarns, polyester yarns or the like. As shown in FIGS. 2 to 4, the bag body 21 includes an inflatable portion 22 which is inflatable with an inflation gas in such a manner as to separate an inboard side wall 22a deployable on an inboard side away from an outboard side wall 22b deployable on an outboard side, and a uninflatable portion (closed portion) 42 where the inboard side wall 22a and outboard side wall 22b are attached together so as not to admit an inflation gas.

The inflatable portion 22 includes a main inflatable portion (primary inflatable portion) 24 inflatable with an inflation gas fed from the inflator 14 and secondary inflatable portions which are in gas communication with the main inflatable portion 24 and complete inflation after the main inflatable portion 24 has completed inflation so as to protect an occupant's head in the event of a rollover of the vehicle V as well. The secondary inflatable portions include a front sub inflatable portion 30, a central sub inflatable portion 31 and a rear sub inflatable portion 32. The inflatable portion 22 further includes communication portions 33, 34, 35, and 36 which provide gas communication between the main inflatable portion 24 and secondary inflatable portions. In the illustrated embodiment, the bag body 21 is designed to admit inflation gas and inflate generally entirely except at small regions of later-described terminal partitioning portion 44, general partitioning portions 46 and 47 and thickness regulating portions 48, 49, 50 and 51 which partition the inflatable portion 22 into the main inflatable portion 24, front sub inflatable portion 30, central sub inflatable portion 31 and rear sub inflatable portion 32 as shown in FIG. 2.

The main inflatable portion 24 includes a gas feed path 25, a connection port 26, a front seat protection portion 27 and a rear seat protection portion 28.

The gas feed path 25 extends in a front and rear direction along the upper edge 21a of the bag body 21 and is arranged over a generally entire area in a front and rear direction of the main inflatable portion 24. The gas feed path 25 directs an inflation gas G discharged from the inflator 14 into the front seat protection portion 27 and rear seat protection portion 28 located below the gas feed path 25. In the illustrated embodiment, at a position slightly forward relative to the center in a front and rear direction of the gas feed path 25 (in other words, generally at the center in a front and rear direction of the bag body 21) is the connection port 26 connected with the inflator 14. The connection port 26 is in gas communication with the gas feed path 25 and projects upward from the gas feed path 25 in a rearward and upwardly slanted fashion. The connection port 26 is open at the rear end 26a for receiving the inflator 14. The inflator 14 is inserted therein and fastened with the clamp 15, thus the connection port 26 and the inflator 14 are connected. In the illustrated embodiment, a separate inner tube (reference numeral omitted) is disposed in an area ranging from the connection port 26 to a region of the gas feed path 25 immediately below the connection port 26 for enhancing heat resistance (FIG. 2).

The front seat protection portion 27 is deployable at a side of the front seat (i.e., the driver's seat DS) for protecting the head H of an occupant (driver) P seated in the front seat (driver's seat) in the event of a side impact. The rear seat protection portion 28 is deployable at a side of the rear seat for protecting the head of an occupant seated in the rear seat in the event of a side impact.

The front sub inflatable portion 30 adjoins the main inflatable portion 24 (the front seat protection portion 27) in front of the main inflatable portion 24 and is located at the front end 21c region of the bag body 21. In the bag body 21 of the illustrated embodiment, the front sub inflatable portion 30 constitutes a terminal inflatable portion 38. The front sub inflatable portion 30 is inflatable into a generally vertical rod and is partitioned from the front seat protection portion 27 by a later-described terminal partitioning portion (closed portion) 44. In the illustrated embodiment, the front sub inflatable portion 30 is so deployable as to extend farther downward relative to the beltline BL such that its lower end is disposed on the lower side of the front seat protection portion 27. The front sub inflatable portion 30 is in gas communication with the front seat protection portion 27 via the communication portion 33 located at the rear upper end and the communication portion 34 located at the rear lower end. Each of the communication portions 33 and 34 has a small opening width so as to delay a start of inflow of an inflation gas into the front sub inflatable portion 30 relative to the front seat protection portion 27.

The central sub inflatable portion 31 of the illustrated embodiment adjoins the front seat protection portion 27 of the main inflatable portion 24 at the rear of the front seat protection portion 27 and is located below the gas feed path 25. The central sub inflatable portion 31 is in gas communication with the front seat protection portion 27 via the communication portion 35 disposed at the rear of the front seat protection portion 27. The communication portion 35 also has a small opening width so as to delay a start of inflow of an inflation gas into the central sub inflatable portion 31 relative to the front seat protection portion 27. The rear sub inflatable portion 32 adjoins the rear seat protection portion 28 of the main inflatable portion 24 and is so disposed as to fill up an area between the central sub inflatable portion 31 and the rear seat protection portion 28 below the gas feed path 25. The rear sub inflatable portion 32 is in gas communication with the rear seat protection portion 28 via the communication portion 36 located at the front end of the rear seat protection portion 28. The communication portion 36 also has a small opening width so as to delay a start of inflow of an inflation gas into the rear sub inflatable portion 32 relative to the rear seat protection portion 28.

Figure 7:
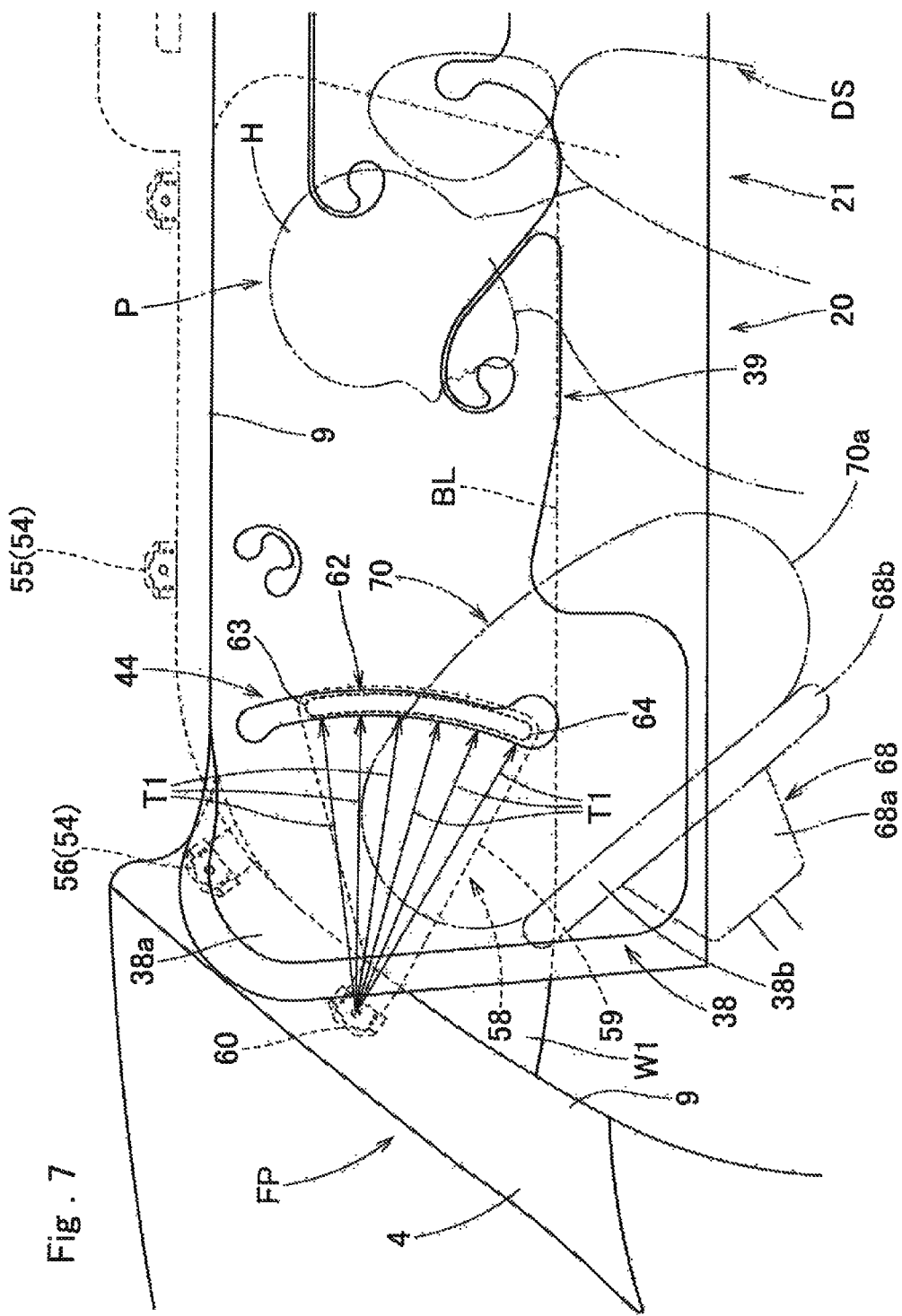
FIG. 7 is a partial enlarged front view of the head-protecting airbag device at airbag deployment as viewed from the vehicle interior.

In the illustrated embodiment, the front sub inflatable portion 30 constitutes the terminal inflatable portion 38 located at the front end 21c region of the bag body 21, and a region of the inflatable portion 22 except the terminal inflatable portion 38 forms a general inflatable portion 39. The terminal inflatable portion 38 is partitioned from the front seat protection portion 27 (i.e., from the general inflatable portion 39) by the terminal partitioning portion 44. More specifically, the terminal partitioning portion 44 of the illustrated embodiment is formed into such a rod that is isolated from a later-described peripheral portion 43 and extends generally along an up and down direction in a curved, generally arcuate fashion such that the center in an up and down direction of the terminal partitioning portion 44 is disposed farther rearward than the upper and lower ends. The terminal Inflatable portion 38 is in gas communication with the front seat protection portion 27 by the upper end 38a and lower end 38b via the communication portions 33 and 34. The terminal inflatable portion 38 is so designed that the upper end 38a region is deployed, at airbag deployment, at an inboard side of the front pillar FP which extends in a rearwardly and upwardly slanted fashion relative to an up and down direction at the front periphery of the window W1. In particular, the upper end 38a region of the terminal inflatable portion 38 covers an inboard side of a rear end region of the front pillar garnish 4 covering the front pillar FP at airbag deployment, as shown in FIGS. 6 to 8. As described above, the terminal inflatable portion 38 is so designed as to extend the lower end 38b region farther downward than the beltline BL at airbag deployment (FIGS. 6 to 8). Further, as shown in FIGS. 6 and 7, the terminal inflatable portion 38 is to be so deployed as to overlap, in a left and right direction, with a deployed airbag 70 for a steering wheel 68 disposed in front of the driver's seat DS.

Figure 5:
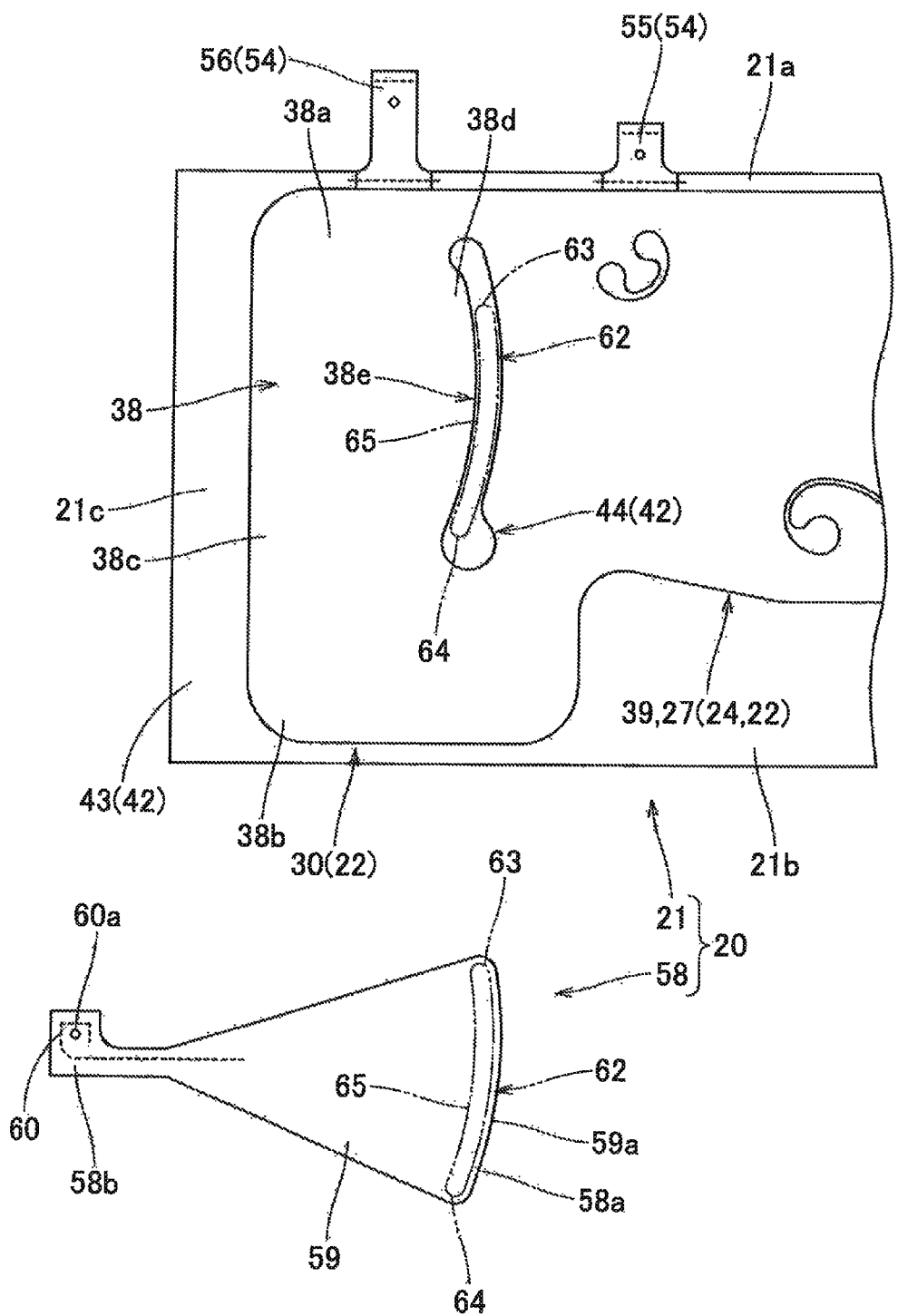
FIG. 5 depicts an airbag body and the connecting member set out side by side by partial enlarged front views.

In the illustrated embodiment, the terminal partitioning portion 44, which partitions the terminal inflatable portion 38 (i.e., the front sub inflatable portion 30) from the general inflatable portion 39 (i.e., the front seat protection portion 27), is curved in such a generally arcuate fashion that the center in an up and down direction is disposed farther rearward than the upper and lower ends. In a similar fashion, a later-described joint 62, which joints the connecting member 58 to the terminal partitioning portion 44, Is formed in a curved fashion along the terminal partitioning portion 44. As shown in FIG. 5, the terminal inflatable portion 38 is so designed that a part of the rear end 38d region (an intermediate region 38e of the rear end 38d region) is disposed between upper and lower ends (i.e., between an upper jointing point 63 and a lower jointing point 64) of the joint 62 at airbag deployment.

The uninflatable portion or closed portion 42 includes a peripheral portion 43 defining an outer periphery of the inflatable portion 22, a terminal partitioning portion 44, general partitioning portions 46 and 47, thickness regulating portions 48, 49, 50 and 51 each of which is disposed within an area of the inflatable portion 22, and a plurality of mounting portions (upper edge mounting portions) 54 which are used to mount the upper edge 21a of the bag body 21 on the vehicle body structure 1.

The peripheral portion 43 is so arranged as to enclose the inflatable portion 22 entirely except the rear end 26a of the connection port 26.

The terminal partitioning portion 44 partitions the front sub inflatable portion 30 from the front seat protection portion 27 (i.e., partitions the terminal inflatable portion 38 from the general inflatable portion 39) and is formed into such an elongate shape extending generally in an up and down direction that the upper and lower ends are isolated from the peripheral portion 43. Specifically, the terminal partitioning portion 44 is formed into a curved rod which extends generally along an up and down direction, like such a generally circular arc that the center in an up and down direction of the terminal partitioning portion 44 protrudes rearward (i.e., towards the general inflatable portion 39). Even more specifically, the terminal partitioning portion 44 is so designed that, in a state where the connecting member 58 is jointed to the bag body 21, the shortest distance between the terminal partitioning portion 44 and the mounting portion 60 formed at the leading end (second end, front end) 58b of the connecting member 58 is generally equal at any point in an up and down direction thereof. Therefore, the front edge 44c forms a continuous curve like a circular arc extending around the mounting portion 60. Even more precisely, the front edge 44c of the terminal partitioning portion 44 forms an arc of a circle centered at the mounting hole 60a of the mounting portion 60. In the illustrated embodiment, the upper end region of the front edge 44c is disposed slightly farther rearward than the lower end region. The upper end 44a of the terminal partitioning portion 44 is disposed on the upper side than a later-described general partitioning portion 47. The terminal partitioning portion 44 is provided at the lower end 44b with a bulging portion 45 bulging toward the rear, and is so designed that the lower end 44b region is deployable generally on the beltline BL. Moreover, the terminal partitioning portion 44 is so designed as to be deployable at a position corresponding to an outmost region 70a of the airbag 70 for a steering wheel as deployed as shown in FIG. 9.

The general partitioning portions 46 and 47 are located in an area of the general inflatable portion 39 and divide the general inflatable portion 39 into the gas feed path 25, front seat protection portion 27, rear seat protection portion 28, central sub inflatable portion 31 and rear sub inflatable portion 32. The general partitioning portion 46 is formed into a generally rod extending upward from a lower edge region of the peripheral portion 43 and partitions the central sub inflatable portion 31 from the rear sub inflatable portion 32. The general partitioning portion 47 extends forward and rearward from the upper end of the general partitioning portion 46 and forms the lower edge of the gas feed path 25 while partitioning the central sub inflatable portion 31 and the rear sub inflatable portion 32 from the gas feed path 25. The general partitioning portion 47 includes at the front end a curving partitioning portion 47a which bends downward in a curving fashion for partitioning the front seat protection portion 27 from the central sub inflatable portion 31 and regulates the thickness of this region.

The thickness regulating portion 48 is formed into a generally flat U-shape and is located proximate to the front end of the gas feed path 25. The thickness regulating portion 48 prevents a front upper region of the front seat protection portion 27 integral with the gas feed path 25 from inflating too thick. The thickness regulating portion 49 is formed into a generally inverted J-shape and is located in a lower end region of the front seat protection portion 27. The thickness regulating portion 49 protrudes out of the lower edge region of the peripheral portion 43 forward and upwardly in a slanted fashion. The thickness regulating portion 50 is located in a lower end region of the central sub inflatable portion 31 and protrudes upward out of the lower edge region of the peripheral portion 43. The thickness regulating portion 51 is located in a vicinity of a border between the rear sub inflatable portion 32 and rear seat protection portion 28 and protrudes upward out of the lower edge region of the peripheral portion 43. In the airbag 20 of the illustrated embodiment, a clearance between the terminal partitioning portion 44 and an upper edge region of the peripheral portion 43 forms the communication portion 33, and a clearance between the terminal partitioning portion 44 and the lower edge region of the peripheral portion 43 forms the communication portion 34. Further, a clearance between the curving partitioning portion 47a of the general partitioning portion 47 and the thickness regulating portion 50 forms the communication portion 35, and a clearance between the rear end of the general partitioning portion 47 and the thickness regulating portion 51 forms the communication portion 36.

The mounting portions 54 (upper edge mounting portions) are provided in plurality along a front and rear direction of the upper edge 21a of the bag body 21. In the illustrated embodiment, six mounting portions 54 are formed on the upper edge 21a of the bag body 21. The mounting portions 54 include a terminal mounting portion 56 that is located at an upper edge of the terminal inflatable portion 38 and general mounting portions 55 that are disposed at an upper edge of the general inflatable portion 39. An upward protruding amount of the terminal mounting portion 56 is greater than that of each of the general mounting portions 55. Each of the terminal mounting portion 56 and general mounting portions 55 is provided with a mounting hole 55a/56a for receiving a mounting bolt 12. The mounting hole 56a of the terminal mounting portion 56 is disposed at an upper end region of the terminal mounting portion 56 such that the terminal mounting portion 56 is secured to the inner panel 2 at the front pillar FP by the upper end region. More specifically, as shown in FIGS. 2 and 3, the terminal mounting portion 56 is disposed slightly at the rear of the center in a front and rear direction of the terminal inflatable portion 38 in the bad body 21 as unfolded in a flat fashion, and is adapted to be mounted in a vicinity of the upper end (rear end) of the front pillar FP as shown in FIGS. 6 and 7. The terminal inflatable portion 38 is so designed that the upper end 38a region protrudes out of the front pillar garnish 4 and covers an inboard side of the front pillar garnish 4 at airbag deployment as shown in FIGS. 6 to 8, and the terminal mounting portion 56 is deployed in such a manner as to make a detour around the lower hem of the front pillar garnish 4 (i.e., the airbag cover 9) as opened as shown in FIG. 8. The upward protruding amount (i.e., the length) of the terminal mounting portion 56 out of the bag body 21 is so determined as not to pull the terminal inflatable portion 38 in an undue fashion and deploy the upper end 38a region of the terminal inflatable portion 38 at such a position that the upper end 38a region is supported by the upper end region of the front pillar garnish 4 at airbag deployment. In the illustrated embodiment, the length of the terminal mounting portion 56 (i.e., the distance between the upper edge 21a of the bag body 21 and the mounting hole 56a) is about four times of the length of each of the general mounting portions 55 (i.e., the distance between the upper edge 21a of the bag body 21 and the mounting hole 55a).

The connecting member 58 is formed of a flexible sheet material. The connecting member 58 of the illustrated embodiment is fabricated of a woven fabric of polyamide yarn, polyester yarn or the like. As shown in FIGS. 2 to 4 and 6 to 9, the connecting member 58 is deployable on an outboard side of the terminal inflatable portion 38, and is jointed to the bag body 21 by its root portion (i.e., first end) 58a. Specifically, the root portion 58a of the connecting member 58 is connected to the terminal partitioning portion 44 disposed in the front end 21c region of the bag body 21. The connecting member 58 includes at the leading end (i.e., second end) a mounting portion 60, which is adapted to be secured to the vehicle body structure 1 at the periphery of the window W1 distant from the front end 21c of the bag body 21. Specifically, in a similar fashion to each of the mounting portions 54 (the general mounting portions 55 and terminal mounting portion 56) of the bag body 21, the mounting portion 60 is adapted to be secured to the inner panel 2 (i.e., vehicle body structure 1) at the front pillar FP with the aid of the mounting bracket 11 and mounting bolts 12, and includes a mounting hole 60a for receiving the mounting bolts 12.

In the illustrated embodiment, as shown in FIG. 5, the connecting member 58 is formed into such a generally sectorial contour which enlarges towards the root portion (first end) 58a (i.e., rearward) from the leading end (or front end, second end) 58b, and the root portion 58a (or rear edge) is connected to the terminal partitioning portion 44 of the bag body 21. That is, the connecting member 58 includes a cover portion 59 for covering a generally triangular area of the outboard side of the terminal inflatable portion 38 defined by the mounting portion 60 and the joint 62. The joint 62 is formed of a stitch of a sewing thread at the rear edge 59a of the cover portion 59 (i.e., at the root portion 58a), in such a manner as to sew (joint) a generally entire region in an up and down direction of the rear edge 59a of the cover portion 59 to the terminal partitioning portion 44 (FIGS. 2 to 4), in a corresponding fashion to the terminal partitioning portion (closed portion) 44.

As shown in FIGS. 2 and 3, the joint 62 is, in such a manner as to correspond to the front edge 44c of the terminal partitioning portion 44, formed into such a continuous curve as to draw an arc of a circle centered at the mounting portion 60 formed at the leading end 58b. The joint 62 includes an upper jointing point 63 disposed at the upper end, a lower jointing point 64 disposed at the lower end and a connecting portion (continuous jointing portion) 65. More specifically, the joint 62 is formed into an arc of a circle centered at the mounting hole 60a of the mounting portion 60. That is, in the illustrated embodiment, shortest distances L (FIG. 3) between each of the upper jointing point 63 and lower jointing point 64 and the mounting portion 60 are equal and the connecting portion 65 connect the upper jointing point 63 and lower jointing point 64 and forms a continuous curve like a circular arc extending around the mounting portion 60 as well. In other words, the joint 62 forms an arc of a circle with radius L, such that no portion of the joint 62 has a shortest distance from the mounting portion 60 shorter than the distance L between the upper jointing point 63/lower jointing point 64 and the mounting portion 60. Even more specifically, the joint 62 is disposed over a generally entire area of the terminal partitioning portion 44 except an upper end region 44a in such a manner as to join a generally entire area in an up and down direction of the rear edge 59a of the cover portion 59 to the terminal partitioning portion 44. The upper jointing point 63 is disposed slightly on the upper side of the mounting portion 60 and is on a generally same level in an up and down direction as the general partitioning portion 47. The lower jointing point 64 is disposed proximate the lower end 44b of the terminal partitioning portion 44 and on the lower side of the mounting portion 60. Particularly, the joint 62 is formed into a double line at the connecting portion 65 while each of the upper jointing point 63 and lower jointing point 64, i.e., the terminal regions, is formed into a semicircular arc connecting ends of the double lines of the connecting portion 65, in order to prevent stress concentration.

The connecting member 58 is designed to generate a tension force T1 generally in a front and rear direction of the bag body 21 as deployed on board. In the airbag 20 of the illustrated embodiment as deployed, specifically, the tension force T1 is exerted radially between the mounting portion 60 of the connecting member 58 as mounted on board and the joint 62 (i.e., over a generally entire area in an up and down direction of the joint 62), as shown in FIG. 7. Moreover, at deployment of the bag body 21, each of the front seat protection portion 27, rear seat protection portion 28, central sub inflatable portion 31 and rear sub inflatable region 32 is inflated from an uninflated state in such a manner as to contract in dimension in a front and rear direction, thus another tension T2 is exerted generally along a front and rear direction between the terminal partitioning portion 44 and the general mounting portion 55B located at the rear end of the bag body 21, specifically on a straight line connecting a generally center in an up and down direction of the terminal partitioning portion 44 and general mounting portion 55B, as shown in FIG. 6.

The vehicle V on which the airbag device M of the embodiment is to be mountd is also provided with an airbag device 69 for a steering wheel 68 disposed in front of the driver's seat DS as shown in FIG. 1, which is designed to be actuated in the event of a frontal impact. The airbag device 69 includes an airbag 70 housed in a boss 68a of the steering wheel 68 in a folded-up configuration and an inflator (not shown) for feeding the airbag 70 with an inflation gas. As shown in FIGS. 6 to 9, the airbag 70 is deployable over the top plane of a rim 68b of the steering wheel 68 with the aid of the inflation gas when an impact acts on the vehicle V from the front or oblique front.

Mounting of the head-protecting airbag device M on the vehicle V is now described. The connecting member 58 is sewn to the bag body 21 in advance. Then, from a flattened state where the inboard side wall 22a and outboard side wall 22b overlap each other, the bag body 21 is folded up together with the connecting member 58 in such a manner that the lower edge 21b is brought close to the upper edge 21a. When the airbag 20 is folded up, a breakable wrapping member (not shown) is wrapped around predetermined regions of the airbag 20 for keeping the folded-up configuration.

Thereafter, the mounting bracket 16 is mounted on the inflator 14, and then the inflator 14 is connected with the connection port 26 of the airbag 20 with the clamp 15. The mounting brackets 11 are attached to the mounting portion 60 of the connecting member 58 and the mounting portions 54 (the terminal mounting portion 56 and general mounting portions 55) of the airbag body 21. Thus an airbag module is provided.

Subsequently, the mounting brackets 11 and 16 are located at predetermined positions on the inner panel 2 and fixed thereto with the bolts 12 and 17. Then, a not-shown lead wire extending from a suitable control for actuating the inflator is connected to the inflator 14. If then the front pillar garnish 4, the roof head liner 5 and the pillar garnishes 6 and 7 are mounted on the inner panel 2, the head-protecting airbag device M is mounted on the vehicle V.

After the airbag device M is mounted on the vehicle V, when the inflator 14 is actuated in response to an actuating signal fed from the control in the event of a side impact, an oblique collision or a rollover of the vehicle V, an inflation gas discharged from the inflator 14 flows into the bag body 21, and the bag body 21 then breaks the wrapping member, pushes and opens the airbag cover 9 composed of the lower hems of the front pillar garnish 4 and roof head liner 5, and deploys downward and covers inboard sides of the windows W1, W2, the center pillar CP, and the rear pillar RP, as shown in FIG. 1 (double-dotted lines) and FIG. 6. If the impact is an oblique impact, the airbag device 69 for a steering wheel 68 is actuated as well and deploys the airbag 70 as shown in FIG. 6 (double-dotted lines) and FIGS. 8 and 9. At deployment of the airbag 20, since the tension T1 is exerted between the mounting portion 60 of the connecting member 58 and the joint 62 as shown in FIG. 7, the connecting member 58 will support the outboard side of the terminal inflatable portion 38 and help bend the terminal inflatable portion 38 relative to the general inflatable portion 39 at the terminal partitioning portion 44, such that the connecting member 58 will push the terminal inflatable portion 38 towards the interior I of the vehicle V and deploys the terminal inflatable portion 38 in such a slanted fashion that the front edge 38c is directed toward the vehicle interior I, as shown in FIG. 9.

In the head-protecting airbag device M of the foregoing embodiment, the connecting member 58 disposed over the outboard side of the terminal inflatable portion 38 is jointed to the terminal partitioning portion 44 (i.e., the closed portion or uninflatable portion 42) of the bag body 21 by the root portion 58a at least at two jointing points 63 and 64 disposed away from each other in an up and down direction. The shortest distances L between the upper jointing point 63/lower jointing point 64 and the mounting portion 60, which is formed at the leading end (second end) 58b of the connecting member 58 to be secured to the vehicle body structure 1, are generally equal, such that the connecting member 58 is not jointed to the bag body 21 at any position closer to the mounting portion 60 than the jointing points 63 and 64. That is, since the upper jointing point 63 and lower jointing point 64 are disposed away from each other in an up and down direction and the shortest distances L between the upper jointing point 63/lower jointing point 64 and the mounting portion 60 are generally equal, the tension force F1 occurs at least on two lines connecting the upper jointing point 63/lower jointing point 64 and the mounting portion 60 at airbag deployment. Accordingly, the head-protecting airbag device M of the illustrated embodiment will be able to exert the tension force T1 in a greater area in an up and down direction of the connecting member 58 at airbag deployment in comparison with conventional head-protecting airbag devices, and enable this connecting member 58 to support the outboard side of the terminal inflatable portion 38 in a steady fashion. As a consequence, the terminal inflatable portion 38 as fully inflated will be able to protect the head H of the occupant (driver) P when it moves obliquely forward and toward an outboard direction O at an oblique collision or the like.

Therefore, the head-protecting airbag device M of the illustrated embodiment is capable of exerting the tension force T1 in a wide area in an up and down direction in the connecting member 58 in a steady fashion at airbag deployment such that the connecting member 58 supports the outboard side of the terminal Inflatable portion 38 in a steady fashion.

In the airbag device M, the terminal partitioning portion 44 (i.e., the closed portion or uninflatable portion 42) is formed into an elongate shape extending generally along an up and down direction in such a manner as to partition the terminal inflatable portion 38 from the general inflatable portion 39. This configuration will help inflate the terminal inflatable portion 38 into a rod shape extending generally along an up and down direction and deploy the terminal inflatable portion 38 towards the interior I of the vehicle in such a manner that the terminal inflatable portion 38 is bent towards the interior I of vehicle at the terminal partitioning portion 44 relative to the general inflatable portion 39 while being supported by the connecting member 58 (FIG. 9). Such a terminal inflatable portion 38 will be further suitable for protecting the occupant's (driver's) head H when it moves obliquely forward and toward an outboard direction. If such an advantageous effect does not have to be considered, the dosed portion may be composed of, by way of example, at least two closed portions disposed separate in an up and down direction.

In the airbag device M of the illustrated embodiment, the connecting member 58 includes a cover portion 59 for covering a generally triangular area of the outboard side of the terminal inflatable portion 38 defined by the mounting portion 60, the upper jointing point 63 and lower jointing point 64. At airbag deployment, such a cover portion 59 of the connecting member 58 will support a wide area of the outboard side of the terminal Inflatable portion 38 and secure a generally uniform reaction force in the wide area when the terminal inflatable portion 38 cushions the occupant's head H such that the terminal inflatable portion 38 cushions the occupant's head H in an adequate fashion. If such an advantageous effect does not have to be considered, the connecting member may be formed of a generally Y-shaped band, without the cover portion, which is formed by connecting bands extending obliquely from each of the jointing points and a band extending from the mounting portion together.

In the airbag device M of the embodiment, the terminal partitioning portion 44 disposed at the rear of the terminal inflatable portion 38 is formed into an arcuate shape curving along the joint 62 such that a part of the terminal inflatable portion 38 (i.e., the intermediate region 38e of the rear end 38d region) is disposed between the upper jointing point 63 and lower jointing point 64. This configuration widens an inflatable area of the terminal inflatable portion 38 such that the terminal inflatable portion 38 is inflated in a thick fashion. Without considering such an advantageous effect, the terminal partitioning portion may be formed into such a shape as to have a generally straight front edge while the connecting member is jointed thereto with a curved joint in a generally arcuate fashion.

Moreover, in the airbag device M of the foregoing embodiment, the joint 62 is formed into such a continuous curve as to connect the upper jointing point 63 and lower jointing point 64 and draw an arc of a circle centered at the mounting portion 60, in a corresponding fashion to the terminal partitioning portion 44. With this configuration, the connecting member 58 will exert a great tension force T1 pulling an edge of the root portion 58a in a generally uniform fashion in a generally entire area in an up and down direction at airbag deployment, as shown in FIG. 7. Further, since the terminal partitioning portion 44 to which the curved joint 62 is jointed has a curved shape in a similar fashion to the joint 62, a generally entire area in an up and down direction of the connecting member 58 will smoothly cover and support the outer surface (the outboard side) of the terminal inflatable portion 38 in a vicinity of the terminal partitioning portion 44 (i.e., the rear edge 38d region), as shown in FIG. 9. Thus the connecting member 58 will be able to secure a uniform reaction force in a generally entire area in an up and down direction and support a wide area in an up and down direction of the terminal inflatable portion 38 when the portion 38 cushions the occupant's head H, such that the portion 38 will cushion the occupant's head H in an adequate fashion.

Figure 10:
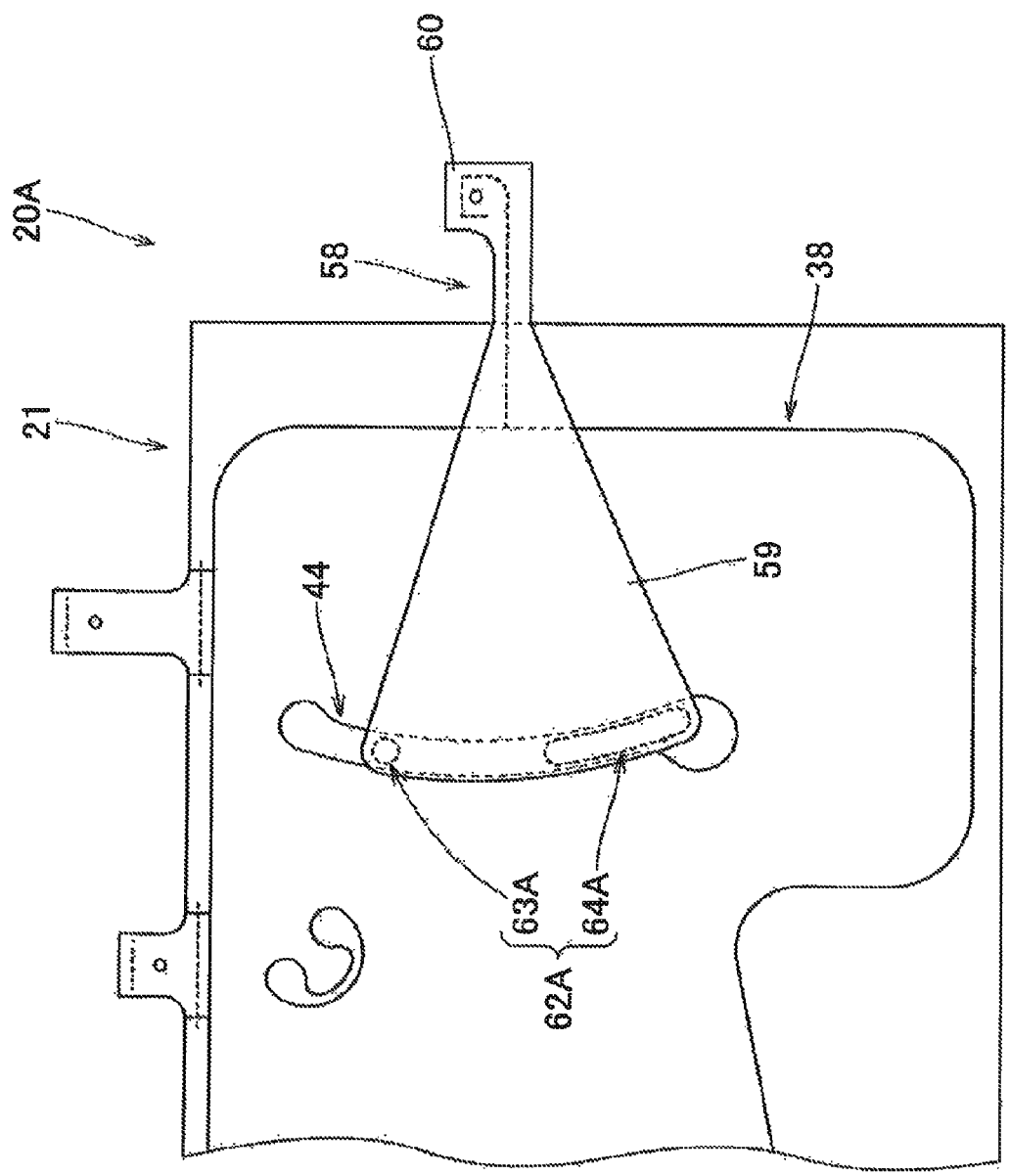
FIG. 10 is a partial enlarged rear view of an alternative embodiment of the invention.
Figure 11:
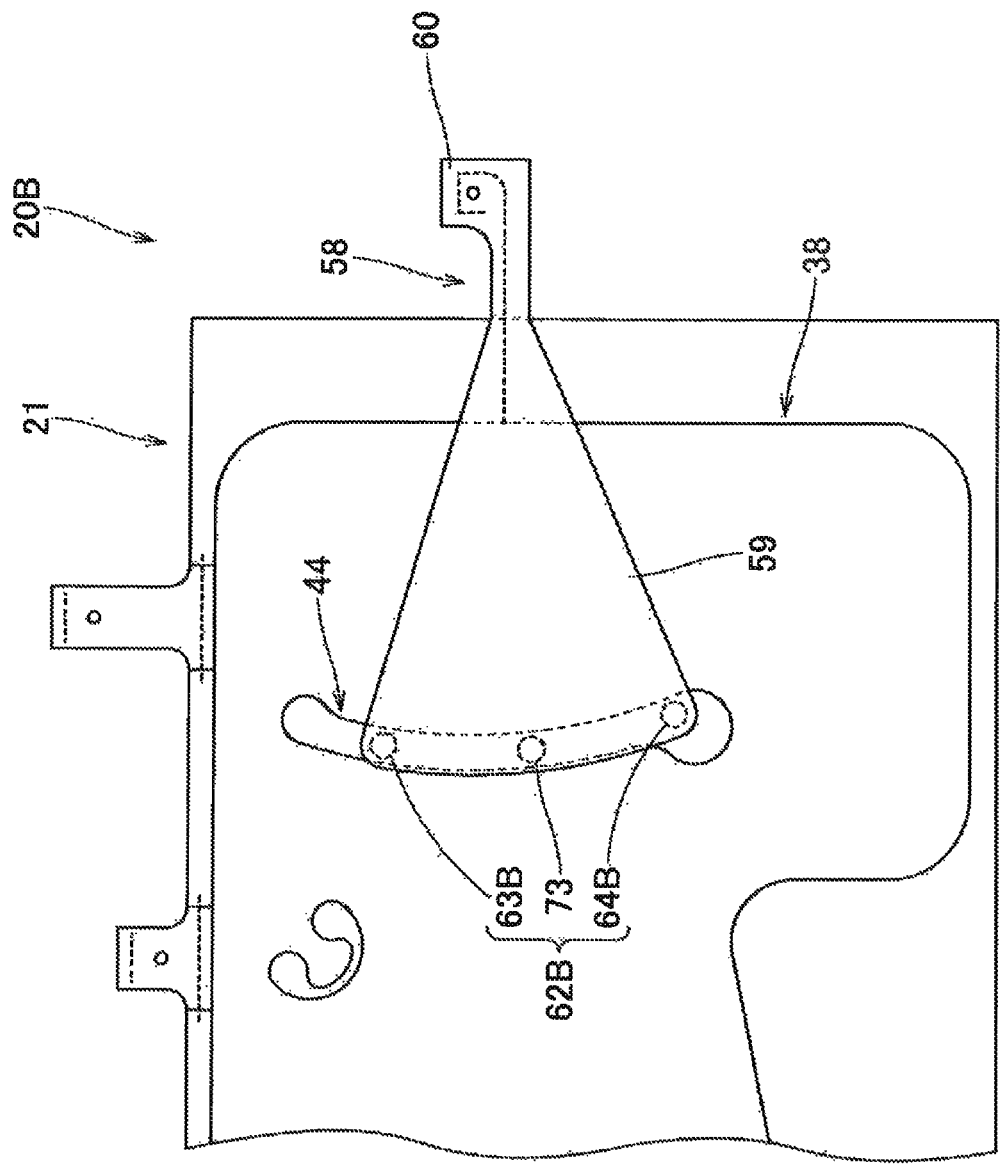
FIG. 11 is a partial enlarged rear view of another alternative embodiment of the invention.

FIG. 10 depicts an alternative configuration of the joint to join the connecting member 58 to the terminal partitioning portion 44. A joint 62A of an airbag 20A includes an upper jointing point 63A having a generally circular shape and a lower jointing point 64A which is separate from the upper jointing point 63A and formed into such a curve as to draw an arc of a circle centered at the mounting portion 60, shaped to the terminal partitioning portion 44. That is, one of the jointing points, i.e., the lower jointing point 64A, is formed into a curve shaped to the terminal partitioning portion 44. Also with this configuration, a tension force will be exerted in the curved lower jointing point 64A of the connecting member 58 to pull the whole jointing point 64A in a generally uniform fashion at airbag deployment. Further, since the terminal partitioning portion 44 to which the lower jointing point 64A is jointed has a curved shape in a similar fashion to the lower jointing point 64A, the connecting member 58 will smoothly cover and support the outer surface of the terminal inflatable portion 38 in a vicinity of the terminal partitioning portion 44 in an area of the lower jointing point 64A. Thus the connecting member 58 will be able to secure a uniform reaction force in the area of the lower jointing point 64A and support the terminal inflatable portion 38 when the portion 38 cushions the occupant's head H, such that the terminal inflatable portion 38 will cushion the occupant's head H in an adequate fashion. Without considering such an advantageous effect, it is also conceivable to form both of the upper and lower jointing points into a circle. The number of the jointing points should not be limited to two. By way of example, FIG. 11 depicts a joint 62B of an airbag 20B, which has three jointing points, i.e., an upper jointing point 63B, a lower jointing point 64B and an additional intermediate jointing point 73 disposed at an intermediate position between the jointing points 63B and 64B. All of the jointing points have a circular shape and is equally distant from the mounting portion 60. The joint may include four jointing points as well. When the joint is composed of a plurality of separate round jointing points, the terminal partitioning portion may be shaped to the outer contour of the joint, i.e., into separate circles, although it is formed into an elongate circular arc in the foregoing embodiment.

In the airbag device M of the foregoing embodiment, furthermore, the lower jointing point 64 is disposed at a position on the lower side of the mounting portion 60 formed at the leading end 58b of the connecting member 58 at airbag deployment. With this configuration, at airbag deployment, the connecting member 58 will pull a region of the terminal inflatable portion 38 below the mounting portion 60 forward and towards an outboard direction O, such that the terminal inflatable portion 38, which is secured to the vehicle body structure by the upper edge, is deployed in such a manner as to be twisted. Accordingly, during deployment, the lower end 38b region of the terminal inflatable portion 38 will be prevented from being considerably engaged with the airbag 70 for the steering wheel which is being deployed in proximity, although the bag body 21 is so designed that the lower edge 21b is deployable below the beltline BL of the vehicle for protecting the occupant's head H at an oblique collision or a rollover and the terminal inflatable portion 38 is disposed at the front end 21c region of the bag body 21 so as to be deployable on an inboard side of the front pillar FP extending obliquely vertically in the front edge of the window W1. Further, as shown in FIG. 8, in the airbag 20, the terminal inflatable portion 38 is deployable in such a manner that the lower end 38b is pulled towards an outboard direction O, and the terminal partitioning portion 44 is deployable at the position corresponding to the outmost region 70a of the airbag 70 for a steering wheel as deployed. This configuration will prevent the terminal inflatable portion 38 from being considerably engaged with the airbag 70 at completion of deployment of the airbag 20 as well (FIG. 9).

Moreover, when the bag body 21 is fully deployed, while the lower end 38b region of the terminal inflatable portion 38 is directed toward an outboard direction O, the upper end 38a region is directed toward an interior I relatively, such that the terminal inflatable portion 38 will be deployed in such a manner as to be slanted relative to a left and right direction. Accordingly, as shown in FIG. 9, the upper end 38a region will be deployed in an inwardly protruding fashion in such a manner as to fill up a gap between the airbag 20 and the airbag 70 for a steering wheel, thus smoothly cushioning the head H of the occupant P (driver D) moving obliquely forward and toward an outboard direction O at an oblique collision.

In the airbag device M of the foregoing embodiment, the bag body 21 includes at the upper edge of the terminal inflatable portion 38 a terminal mounting portion 56 to be secured to the vehicle body structure 1, and the upward protruding amount of the terminal mounting portion 56 is greater than that of each of the general mounting portion 55 disposed at the upper edge of the general inflatable portion 39. This configuration will help deploy the terminal inflatable portion 38 generally entirely in an up and down direction in the interior I such that the front edge 38c faces toward the interior I of the vehicle V. Further, since the upper end 38a region of the terminal inflatable portion 38 is secured to the vehicle body structure 1 at the front pillar FP with the terminal mounting portion 56 having a greater upward protruding amount (i.e., length), the lower end region of the terminal mounting portion 56 will make a detour around the lower hem of the front pillar garnish 4 (i.e., the airbag cover 9) as opened and be deployed on an inboard side of the front pillar garnish 4 as shown in FIG. 8, thus the upper end 38a region of the terminal inflatable portion 38 supported by the connecting member 58 will be smoothly deployed over the inboard side of the front pillar FP (front pillar garnish 4). The terminal inflatable portion 38 thus supported at the upper end 38a region by the front pillar FP will protect the occupant's head H when it moves obliquely forward and toward an outboard direction at an oblique collision in an adequate fashion. Furthermore, in the foregoing embodiment, the lower end 38b region of the terminal inflatable portion 38 is so designed as to be deployed below the beltline BL. With this configuration, when cushioning the occupant's head H moving obliquely forward and toward an outboard direction, the lower end 38b region of the terminal inflatable portion 38 will be supported by such a member as a door trim disposed below the beltline BL and protruding inward relative to the window W1 while the upper end 38a region supported by the front pillar garnish 4. Therefore, the terminal inflatable portion 38 will restrain the occupant's head H in an adequate fashion.

Although the foregoing embodiment has been described as is applied to the airbag which has the terminal inflatable portion in the front end region of the bag body, the location of the terminal inflatable portion should not be limited thereby, but the terminal inflatable portion may also be disposed at the rear end region of the bag body.

What is claimed is:

1. A head-protecting airbag device having an airbag that is mountable on an upper periphery of a window of a vehicle on an inboard side of the vehicle in a folded-up configuration and is deployable downward over the window, the airbag comprising:
 a bag body that is adapted to be mounted on a vehicle body structure at the upper periphery of the window by a plurality of positions on an upper edge of the bag body, the bag body including:
  an inflatable portion that is inflatable with an inflation gas fed by an inflator in such a manner as to separate an inboard side wall and an outboard side wall of the bag body, the inflatable portion including a general inflatable portion and a terminal inflatable portion that adjoins the general inflatable portion and is located at a terminal region in a front or rear direction of the bag body as deployed; and a closed portion at which the inboard side wall and the outboard side wall are jointed together;

a connecting member that is formed of a flexible sheet material and disposed over an outboard side of the terminal inflatable portion for exerting a tension force generally along a front and rear direction thereof at deployment of the bag body, the connecting member including a first end that is jointed to the closed portion of the bag body and a second end provided with a mounting portion which is adapted to be secured to the vehicle body structure in the periphery of the window distant from the terminal region of the bag body; and at least two jointing points that joint the first end of the connecting member to the closed portion of the bag body, the jointing points being disposed away from each other in an up and down direction, wherein distances between each of the jointing points and the mounting portion formed at the second end of the connecting member are generally equal, and wherein the connecting member is not jointed to the bag body at any position closer to the mounting portion than the jointing points.

2. The head-protecting airbag device of claim 1, wherein the closed portion is formed into an elongate shape extending generally along an up and down direction in such a manner as to partition the terminal inflatable portion from the general inflatable portion.

3. The head-protecting airbag device of claim 2, wherein the connecting member includes a cover portion that covers a generally triangular area of the outboard side of the terminal inflatable portion defined by the mounting portion and the two jointing points.

4. The head-protecting airbag device of claim 3, wherein:
the closed portion is formed into a rod shape that is curved in a generally arcuate fashion such that a central region in an up and down direction of the closed portion protrudes towards the general inflatable portion; and a part of the terminal inflatable portion is disposed between the upper and lower jointing points.

5. The head-protecting airbag device of claim 4, wherein:
the bag body includes a plurality of jointing points to joint the first end of the connecting member to the closed portion including the upper and lower jointing points; and a part of the plurality of jointing points is formed into such a curve as to draw an arc of a circle centered at the mounting portion in such a manner as to correspond to the closed portion.

6. The head-protecting airbag device of claim 5, wherein the jointing points are elongated to be continuous with each other and form such an elongate curve as to draw an arc of a circle centered at the mounting portion in such a manner as to correspond to the closed portion.

7. The head-protecting airbag device of claim 1, wherein the lower jointing point is disposed at a position on the lower side of the mounting portion at airbag deployment.

8. The head-protecting airbag device of claim 1, wherein the terminal inflatable portion is disposed at a front end region of the bag body.

9. The head-protecting airbag device of claim 1, wherein:
the bag body further includes at the upper edge an upper edge mounting portion that is adapted to be secured to the vehicle body structure;

the upper edge mounting portion includes a terminal mounting portion disposed at an upper edge of the terminal inflatable portion and a general mounting portion disposed at an upper edge of the general inflatable portion; and an upward protruding amount of the terminal mounting portion is greater than that of the general mounting portion.

10. The head-protecting airbag device of claim 1, wherein the connecting member includes a cover portion that covers a generally triangular area of the outboard side of the terminal inflatable portion defined by the mounting portion and the two jointing points.

11. The head-protecting airbag device of claim 10, wherein a part of the terminal inflatable portion is disposed between the upper and lower jointing points.

12. The head-protecting airbag device of claim 1, wherein the at least two jointing points includes at least three jointing points, the at least three jointing points are disposed away from each other in an up and down direction and are arranged in such a curve so as to draw an arc of a circle centered at the mounting portion.

* * * * *